Patented May 1, 1951

2,550,885

UNITED STATES PATENT OFFICE 2,550,885

METHOD OF CLEANING STARCH FROM HEATED SURFACES

Levi M. Thomas, Columbus, Ohio, assignor to The Keever Starch Company, Columbus, Ohio, a corporation of Ohio No Drawing. Application November 20, 1948, Serial No. 61,309

1 Claim. (Cl. 252—163)

The invention disclosed in this application relates to a cleaning compound and to a method of cleaning heated rolls or plates upon which starch has been deposited.

My compound and method are especially useful, for example, in operations relating to textiles such as ironing and pressing. In ironing sheets in commercial laundry operations, the sheets are passed between heated rolls and are thus pressed into the desired state.

Other types of presses are used for ironing shirts, collars and other garments. In using these rolls and presses a small amount of starch is deposited on the heated metal surfaces. At the temperature of the operations (usually 328° F.) the starch dries to a hard film or coating of partly decomposed starch. I have found that certain starch solvents will remove the unchanged starch but a brownish coating of partly decomposed starch is left which cannot be removed by the solvent. I have found that a solution of the starch solvent in which an abrasive has been suspended is a satisfactory and efficient agent for the removal of such starch decomposition products from the heated surfaces. For instance, I prefer to dissolve the starch solvent in water and suspend the abrasive in the solution so that the composition is more economical to use. However, the use of too much water should be avoided as this causes an excessive amount of steam when the material is applied to the heated surfaces. This is undesirable from the view point of the the operator who is doing the cleaning. The solution which I use contains a minimum amount of solvent and abrasive for the efficient use of the product. It will not freeze during shipment to various parts of the country under normal winter conditions.

One of the objects of my invention therefore is the production of a composition for the cleaning of heated surfaces from starch and starch products, which are developed when the starch is heated to the hot press temperature of 328° F.

A further object of my invention is the provision of a composition for the cleaning of heated surfaces consisting of a solution of a starch solvent in water with a suspended abrasive added.

A further object of my invention is a method of cleaning heated surfaces which comprises the substantially simultaneous use of a solvent for starch and of an abrasive.

Further objects and features of my invention will be apparent from a reading of the subjoined specification and claims.

The composition of my invention, therefore, comprises a solution of one or more starch solvents with one or more abrasives suspended in the solution.

As a solvent for starch I prefer to use sorbitol because most other solvents have serious disadvantages such as higher volatility, unpleasant and toxic decomposition products or because they leave residues that are difficult to remove and are harmful to the metal surfaces. Some other solvents are glycerol, glycols, urea, sulfocyanates, and the chlorides of calcium, magnesium and zinc.

For an abrasive I may use a diatomaceous earth, kaolin, talc or chalk or a combination of such substances.

The proportions are not critical, but there are preferred ranges. For example, using about 30 parts of sorbitol I can very advantageously use from 50 to 200 parts of water, from 15 to 35 parts of diatomaceous earth and from 10 to 30 parts of kaolin. More water tends to cause an excess of steam. Less water makes the composition too thick and more expensive. The kaolin can be omitted entirely if desired but its use is preferable. As pointed out above other starch solvents can be substituted for the sorbitol; and other abrasives may be substituted for the diatomaceous earth and kaolin.

As examples of my improved compositions I may set out the following:

Example A 100 grams of a 70% solution of sorbitol;
30 cc. of water;
26 grams of dicalite;
19.5 grams kaolin.

Example B 100 grams of a 70% solution of sorbitol;
30 cc. of water;
26 grams of dicalite;
26 grams kaolin.

Example C 30 grams of sorbitol;
100 grams water;
26 grams dicalite;
19.5 grams kaolin.

Example D 120 grams of dicalite;
26 grams of kaolin;
40 grams talc;
12 grams chalk;
120 grams sorbitol;
400 grams of water.

It is to be understood that the above described embodiments of my invention are for the purpose of illustration only and various changes may be made therein without departing from the spirit and scope of the invention.

I claim:

A method of cleaning starch and starch products from heated surfaces comprising the step of rubbing such surfaces with a water solution of sorbitol having a diatomaceous earth suspended in the solution consisting of 100 parts of water, approximately 30 parts of sorbitol, approximately 25 parts of diatomaceous earth and approximately 10 to 30 parts of kaolin.

LEVI M. THOMAS.

REFERENCES CITED

The following references are of record in the file of this patent:

UNITED STATES PATENTS

| Number | Name | Date |
| --- | --- | --- |
| 1,621,780 | Hirsh | Mar. 22, 1927 |
| 1,693,697 | Hafner | Dec. 4, 1928 |
| 2,256,528 | Rowe | Sept. 23, 1941 |
| 2,375,824 | Saunders | May 15, 1945 |
| 2,435,901 | Peters | Feb. 10, 1948 |
| 2,441,534 | Norton | May 11, 1948 |

FOREIGN PATENTS

| Number | Country | Date |
| --- | --- | --- |
| 563,943 | Great Britain | Sept. 6, 1944 |

OTHER REFERENCES

Navarre: Chemistry and Manufacture of Cosmetics, 1941, p. 554.

Gregory: Uses and Applications of Chemicals, 1944, p. 99.

Kerr: Chemistry and Industry of Starch, 1944, pp. 450 and 451.

Atlas Sorbitol (Atlas Powder Company), 1947, p. 13.